(12) United States Patent
Bristow

(10) Patent No.: US 8,816,541 B1
(45) Date of Patent: Aug. 26, 2014

(54) ELECTRICITY GENERATING APPARATUS

(76) Inventor: Theodore R. Bristow, Kailua-Kona, HI (US)

( * ) Notice: Subject to any disclaimer, the term of this patent is extended or adjusted under 35 U.S.C. 154(b) by 225 days.

(21) Appl. No.: 13/200,765

(22) Filed: Sep. 30, 2011

(51) Int. Cl.
*H02K 35/00* (2006.01)

(52) U.S. Cl.
USPC .......................................... 310/36; 310/113

(58) Field of Classification Search
USPC ................... 310/112–114, 15, 21, 29, 32, 36
See application file for complete search history.

(56) References Cited

U.S. PATENT DOCUMENTS

| | | | | |
|---|---|---|---|---|
| 2,038,954 A | * | 4/1936 | Pace | 310/113 |
| 2,810,083 A | | 10/1957 | Dunay | |
| 3,927,329 A | | 12/1975 | Fawcett et al. | |
| 4,260,901 A | * | 4/1981 | Woodbridge | 290/42 |
| 4,924,123 A | | 5/1990 | Hamajima et al. | |
| 5,347,186 A | * | 9/1994 | Konotchick | 310/17 |
| 5,696,413 A | | 12/1997 | Woodbridge et al. | |
| 5,696,419 A | * | 12/1997 | Rakestraw et al. | 310/268 |
| 5,818,132 A | | 10/1998 | Konotchick | |
| 6,172,426 B1 | | 1/2001 | Galich | |
| 6,798,090 B2 | | 9/2004 | Cheung et al. | |
| 8,299,659 B1 | * | 10/2012 | Bartol, Jr. | 310/36 |

FOREIGN PATENT DOCUMENTS

JP        57082773        5/1982

* cited by examiner

*Primary Examiner* — Dang Le
(74) *Attorney, Agent, or Firm* — Theodore J. Bielen, Jr.

(57) ABSTRACT

An electricity generating apparatus utilizing a pendulum held by a support. The pendulum includes a first portion which rotates on the support and a second portion which travels in a arcuate path. The second end portion of the pendulum includes a magnetic which interacts with a switchable coil to urge the pendulum into a swinging motion. At least one coil is mounted adjacent to the pendulum and interacts with a permanent magnet which is fixed to an element which extends from the pendulum arm. The swinging motion forces the permanent magnet through the coil to generate a electrical power.

9 Claims, 4 Drawing Sheets

ELECTRICITY GENERATING APPARATUS

BACKGROUND OF THE INVENTION

The present invention relates to a novel and useful electricity generating apparatus.

The generation of electrical power is of utmost important in the modern world. Since the invention of the dynamo electrical power using this technology has been the dominant method throughout the world. For example, generators which rotate conductors or magnetic fields in a relative fashion are used to essentially convert mechanical energy into electrical energy. Such generators are also motivated by hydraulic force, steam produce by fossil fuel, and the like. Also electrical energy could be generated through mechanical rotation dynamos using wind and tidal sources. To a lesser extent, solar cells directly convert ultraviolet light into an electrical power using crystalline structures such as those of silicon, germanium, and the like.

As an alternative to electrical power plants, many systems have been proposed to generated electrical power in a similar manner. For example, U.S. Pat. No. 6,798,090 teaches the generation of electricity by multiple magnets located an axis which interact with electrical coils to produce current.

U.S. Pat. No. 2,810,083 and PCT Application WO93/05566 describe accelerating motors which use the interaction of magnets and coils in combination with pendulums.

U.S. Pat. Nos. 4,924,123, 5,818,132, and 6,172,426 show linear generators in which conductors are moved in a linear direction relative to coils in which electrical energy is generated.

U.S. Pat. No. 5,696,413 describes an electrical generator which shows a generator coil that slides over a pole core connected to a float member. The float member obtains movement from waves in a body of water.

U.S. Pat. No. 5,347,186 and Japanese Patent abstract 58200191 describe pendulum electrical generators which employ a permanent magnet that interacts with a coil to create an electrical current.

An electricity generating apparatus which is simple and reliable would be a notable advance in the field of power generation.

BRIEF SUMMARY OF THE INVENTION

In accordance with the present invention a novel and useful electricity generating apparatus is herein provided.

The apparatus of the present invention utilizes a support having a rest or place of contact. A pendulum having an arm is utilized with a first end portion engaging the rest of the support and a second end portion distally located relative to such rest. The second end portion of pendulum travels in an arcuate path when the arm of the pendulum swings. The first end portion of the pendulum arm essentially rotates about or relative to an axis at the rest of the support.

An actuator is also employed in the present invention for swinging the pendulum about or relative to the axis. The actuator possesses a source of magnetic force located at the second end portion of the arm of the pendulum. In certain cases, the provision of such magnetic force includes a placement of a permanent magnet at the second end portion of the arm of the pendulum. A electromagnet is positioned in the vicinity of the permanent magnet in order to interact with the permanent magnet of the pendulum arm. In other words, the electro magnet is located adjacent arcuate path which the second end portion of the arm of the pendulum follows in its swinging motion. A switch selectively activates the electro magnet during portion of the swing of the pendulum arm in order to attract the permanent magnet and, following passage of the permanent magnet from the electromagnet, to allow the permanent magnet to move away. In this manner, the electromagnet, employing a very small amount of power, is able to move the pendulum back and forth.

At least one coil, and preferably many coils, are held in a fixed relationship to the swinging of the pendulum. A member is connected to the pendulum and includes a magnet along the same. The magnet fixed to the member is capable of passing through the fixed coils in order to generate electrical current. The device may include multiple magnets and coils arranged along an arcuate path or in an circular path to achieve this result. Of course, conductors are located to communicate with the fixed coils and to transport the electrical energy or electricity for use as needed, i.e. to illuminate a space, to pump water, to charge a battery, and the like.

It may be apparent that a novel and useful electricity generating apparatus has been heretofore described.

It is therefore an object of the present invention to provide a electricity generating apparatus which is relatively simple to manufacture and maintain.

Another object of the present invention is to provide an electricity generating apparatus which is reliable and uses mechanical motion which is minimal relative prior art devices.

A further object of the present invention is to provide an electricity generating apparatus which utilizes the motion of a pendulum and generates electrical power by the interaction of permanent magnets and conducting coils.

A further object of the present invention is to provide an electricity generating apparatus which operates with a minimum of friction resistance.

Another object of the present invention is to provide an electricity generating apparatus which utilizes known elements in a unique manner to produce electrical power in a highly efficient manner.

The invention passes other objects and advantages which will become apparent as the specification continues.

For a better understanding of the invention reference is made to the following detailed description of the preferred embodiments of the invention which should be taken in conjunction with the above described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior described drawings.

Figure 1:
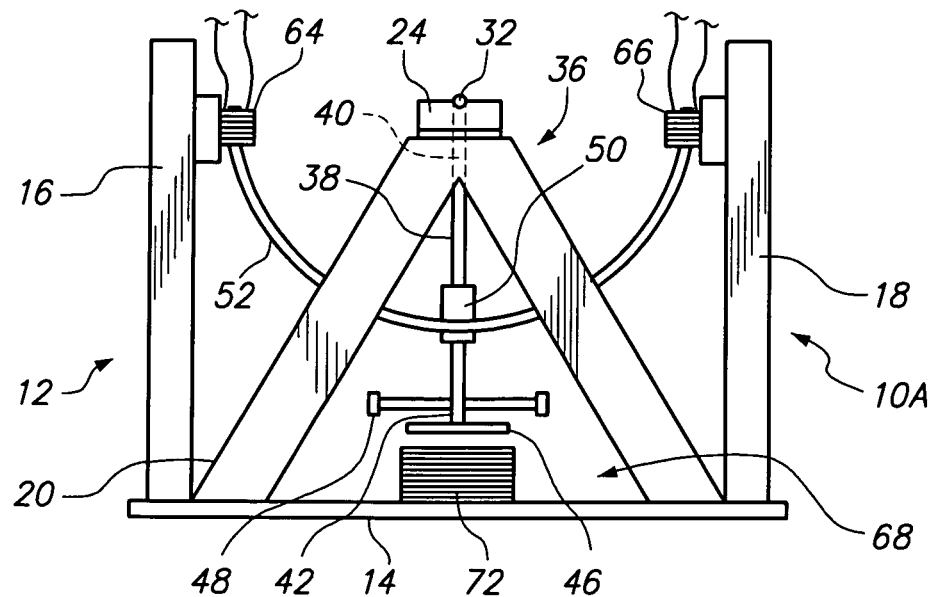
FIG. 1 is a side elevational view of the apparatus of the present invention with the pendulum in a neutral position
Figure 2:
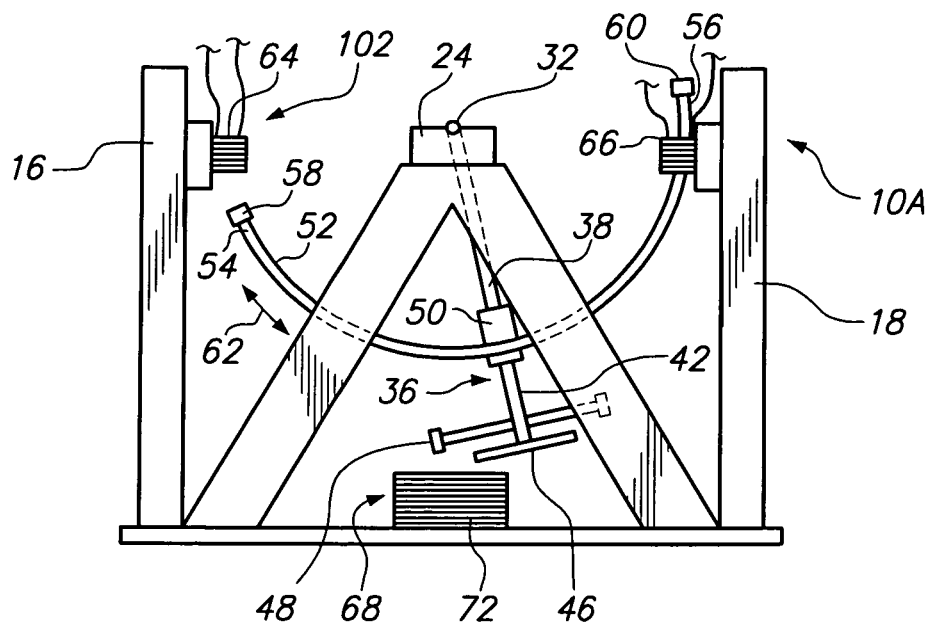
FIG. 2 is a side elevational view of the apparatus of the present invention with the pendulum in a swinging configuration.
Figure 3:
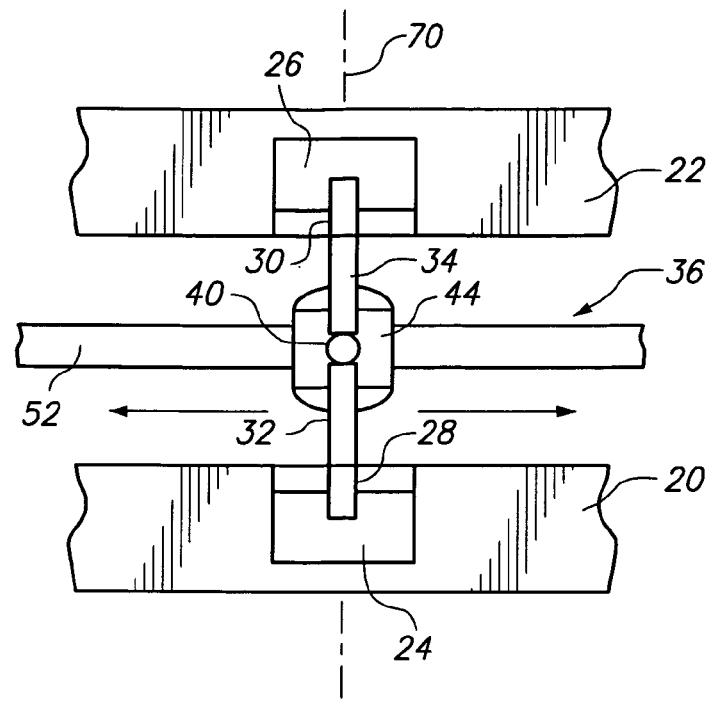
FIG. 3 is a top plan view of the apparatus of the present invention, in part.

Embodiments of the invention are noted in the drawings by reference character 10 followed by a upper case letter. A preferred embodiment of the invention 10A is depicted in FIG. 1 and FIG. 2. Electricity generating apparatus 10A includes as one of its elements support 12. Support 12 is formed with a base 14 having mounts 16 and 18 connected thereto. Pairs of legs 20 and 22 also extends from base 14, FIGS. 1-3. Brackets 24 and 26 lie atop pairs of legs 20 and 22 respectively. Grooves 28 and 30 are found in brackets 24 and 26 to accept rods 32 and 34 which are a portion of pendulum unit 36.

Pendulum unit 36 includes as one of its elements a pendulum arm 38, that possesses a first end portion 40 and a second end portion 42. First end portion 40 of pendulum arm 38 fits into a fixture 44 which also holds rods 32 and 34 in place, FIG. 3. Needless to say, pendulum arm 38 extends downwardly and terminates in a end second end portion 42 which is connected to a permanent magnet 46. Arm 38 of pendulum 36 also may include an adjustable weight 48.

Again referring to FIGS. 1-3, clamp 50 along arm 38 holds member 52 which is generally semicircular in configuration. Member 52 includes terminii 54 and 56 having permanent magnets 58 and 60 thereat. Permanent magnets 58 and 60 may be of any suitable type such as rare earth magnets (neodymium). As heretofore mentioned, pendulum arm 38 swings in a arcuate path and it should be realized that member 52 also follows an arcuate path as indicated by directional arrow 62. Springs may be placed on mounts 16 and 18 to contact pendulum arm 38 during its swinging motion to further aid the arcuate movement of pendulum 36.

Figure 4:
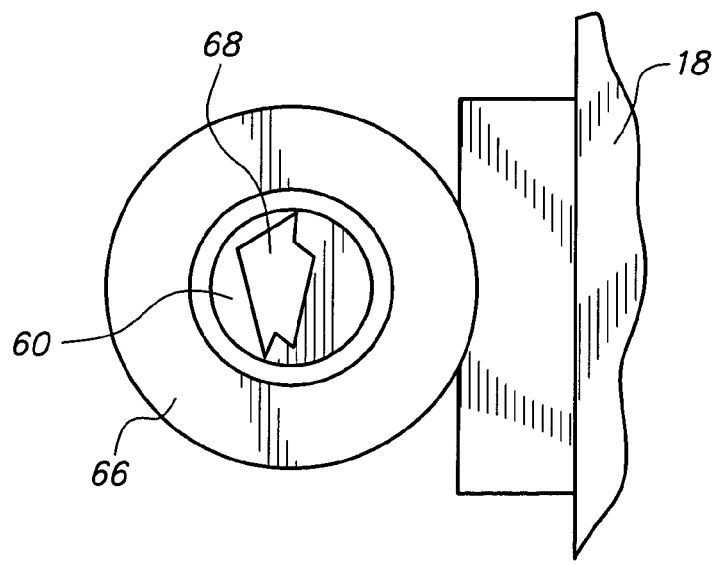
FIG. 4 is a top plan view of a permanent magnet interacting with a fixed coil of the apparatus depicted in FIG. 1, and FIG. 2.

Coils 64 and 66 are held to mounts 16 and 18, respectively. The positioning of coils 64 and 66 is pre-determined in order to allow magnets 58 and 60 to pass through coils 64 and 66, respectively. FIG. 2 shows that permanent magnet 60 has passed through coil 66. Such passage is indicated in FIG. 4, the ouch dynamic being noted by directional arrow 68.

Figure 5:
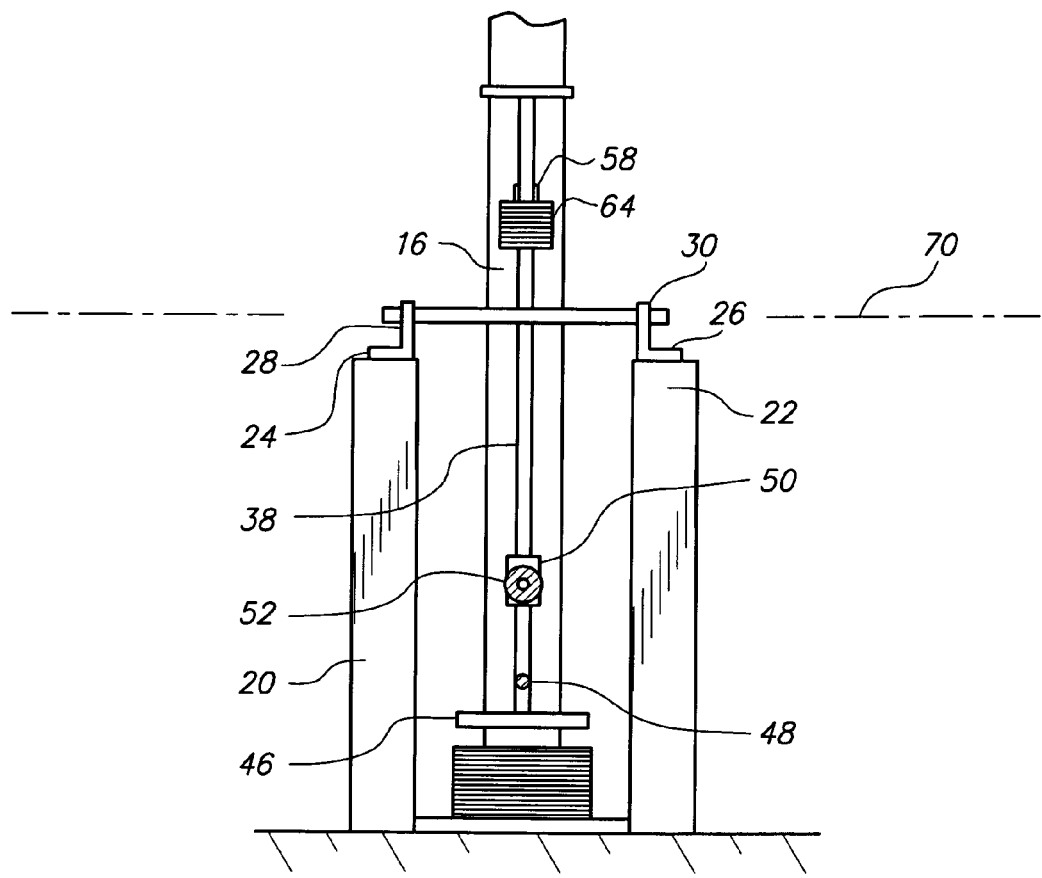
FIG. 5 is a right side view of the apparatus of the present invention.
Figure 6:
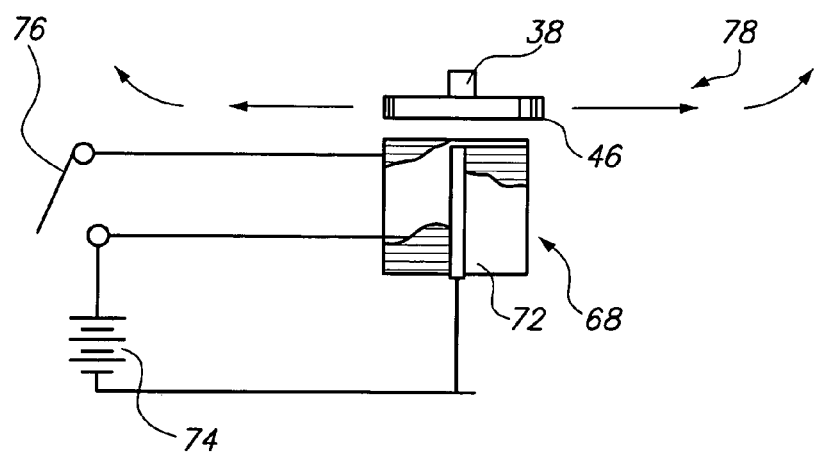
FIG. 6 is a schematic view depicting the switch mechanism used with the pendulum arm of the apparatus of the present invention.

Apparatus 10 is also provided with an actuator 68 for aiding the swinging of pendulum arm 38 and rods 30 and 32, which lie along axis 70, FIG. 5. With reference to FIG. 6, it may be seen that actuator 68 includes an electromagnetic coil 72 which is activated by a source of electrical power 74. Switch 76 is operated to selectively activate electromagnetic coil 72, which in turn produces an magnetic field that attracts permanent magnet 46 when pendulum arm 38 approaches electromagnet coil 72. Likewise, switch 76 is deactivated when arm 38 and permanent magnet 36 pass from electromagnet coil 72. Thus, actuator 68 serves to maintain the swinging motion of pendulum 36, indicated by directional arrows 78.

Figure 7:
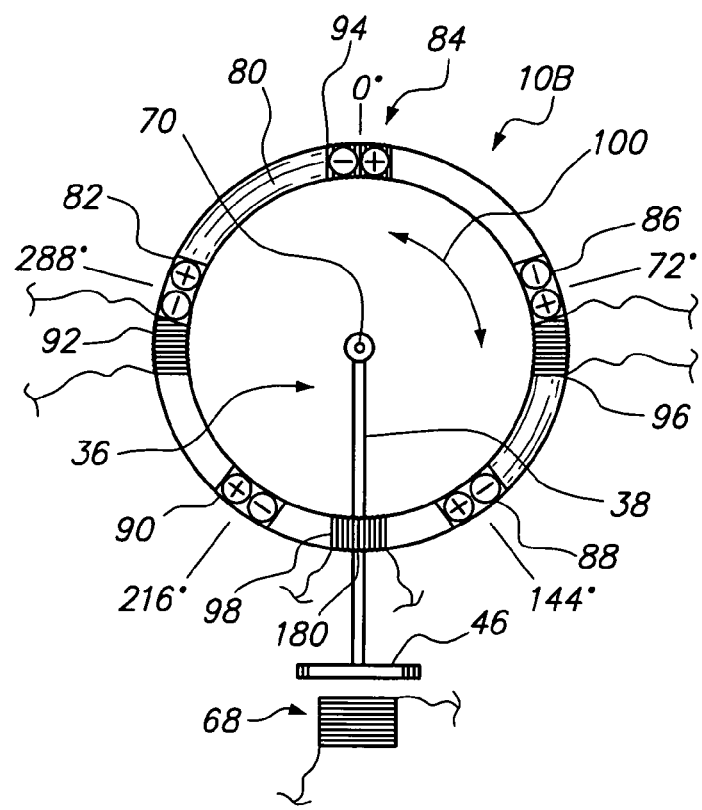
FIG. 7 is a schematic view of another embodiment of the present invention.

Turning to FIG. 7, it may be seen that another embodiment of 10B of the present invention is shown. In this embodiment 10B, pendulum 36 having permanent magnet 46 is depicted schematically. Actuator 68 again maintains the swinging of pendulum 36, specifically arm 38 thereof, about axis 70. However, member 80 is a circular body having fixed magnets 82, 84, 86, 88, and 90. Coils 92, 94, 96, and 98 lie stationary relative to member 80 which is connected to pendulum arm 38. Directional arrow 100 indicates the swinging movement of member 80, and permanent magnets 82, 84, 86, 88, and 90 relative to stationary coils 92, 94, 96, and 98. Plurality of conductors 102 connected to each of the coils 92, 94, 96, and 98 transport electricity generated by apparatus 10B.

In operation, apparatus 10A FIG. 1-6, is initiated by manually swinging pendulum 38 according to directional arrow 62, FIG. 2. Permanent magnets 58, and 60 on member 52 connected to pendulum arm 38 interact with fixed or stationary coils 64, and 66. Such coils are supported in place by mounts 16, and 18. Electrical energy is generated by such interactions and transported by plurality conductors 102 for use. Actuator 68, in the form of an electromagnet, is operated from power source 74 and is switched during an auspicious portion of the swinging cycle of pendulum 36. That is to say, as permanent magnet 46 of pendulum arm 38 approaches electromagnetic 72, a magnetic field of electromagnet 72 is generated to pull the magnetic field of permanent magnet 46. When pendulum arm passes electromagnet 72 switch 76 is turned off. Such switching can take place manually or by the use of coordinating position sensors known in the art. In any case, pendulum 38 maintains its swing and continually generates electricity within the limitations of friction and wear. The same general process takes place with embodiment 10B of FIG. 7 in which member 80 rotates with pendulum 36 according to directional arrow 100. However in this case, multiple magnets 82, 84, 86, 88, and 90 interact with fixed or stationary coils 92, 94, 96, and 98 about axis 70. It should be noted that multiple apparatuses such as the one shown in 10B may be arrayed along axis 70 to increase the amount of electrical energy generated by apparatus 10B.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An electricity generating apparatus, comprising:
   a. a stationary support providing a rest;
   b. a pendulum, said pendulum including an arm having a first end portion rotatably engaging said rest of said support and a second end portion distally located relative to said rest, said second end portion traveling in an arcuate path when said arm swings and said first end portion of said arm rotates about an axis at said rest of said stationary support;
   c. an actuator for swinging said pendulum about said axis, said actuator including a first source of magnetic force at said second end portion of said arm and a second source of magnetic force at said support, said first and second sources of magnetic force attracting one another;
   d. at least one coil held to one mount, said one mount being stationary relative to said swinging of said pendulum; and
   e. at least one magnet fixed to a member connected to said arm of said pendulum, said one magnet oriented to enter and egress the interior of said one coil during said swinging of said pendulum.

2. The apparatus of claim 1 in which said member is curved.

3. The apparatus of claim 1 in which said actuator comprises said first source of magnetic force comprising a permanent magnet located at said second end portion of said arm and said second source of magnetic force comprising an electromagnet positioned to said stationary support in the vicinity of said permanent magnet and said arcuate path of said second end portion of said arm.

4. The apparatus of claim 3 in which said electromagnet of said actuator includes a switch selectively activating said electromagnet.

5. The apparatus of claim 1 which additionally comprises an electrical conductor for transporting electrical current from said one coil.

6. The apparatus of claim 1 in which said one mount is connected to said stationary support.

7. The apparatus of claim 1 in which said member comprises a closed loop.

8. The apparatus of claim 1 which additionally comprises another coil held to another mount, said another coil being fixed relative to said swinging of said pendulum, and another magnet fixed to said member connected to said arm of said pendulum, said another magnet oriented to enter and egress the interior said another coil during said swinging of said pendulum.

9. The apparatus of claim 8 in which said first source of magnetic force at said second end portion of said arm lies between said one and another magnets fixed to said member connected to said arm of said pendulum.

\* \* \* \* \*